United States Patent [19]

Ozin et al.

[11] Patent Number: 4,552,855

[45] Date of Patent: Nov. 12, 1985

[54] METAL ZEOLITE CATALYST PREPARATION

[76] Inventors: Geoffrey A. Ozin, 63 Gormley Ave., Toronto, Canada, M4V 1Y9; Linda F. Nazar, 378 Delaware Ave., Toronto, Canada; Francois Hugues, 2 Avenue Felix Faure, Apt. 2213, Nanterre, France, 9, 92000

[21] Appl. No.: 556,002

[22] Filed: Nov. 30, 1983

Related U.S. Application Data

[63] Continuation of Ser. No. 454,886, Dec. 30, 1982, abandoned.

[51] Int. Cl.⁴ .............................................. B01J 29/10
[52] U.S. Cl. ........................................ 502/74; 502/79; 502/60; 556/140; 556/136; 556/9; 556/10; 556/57; 556/113; 549/206
[58] Field of Search ................. 502/74, 79; 260/429 J, 260/429 AR

[56] References Cited

U.S. PATENT DOCUMENTS

| | | | |
|---|---|---|---|
| 3,264,226 | 8/1966 | Johnson | 252/453 R |
| 3,366,579 | 1/1968 | Laurent | 502/74 |
| 3,647,717 | 3/1972 | Bolton | 502/74 |
| 3,906,017 | 9/1975 | Middleton et al. | 260/429 AR |
| 4,292,253 | 9/1981 | Ozin et al. | 260/429.5 |
| 4,334,101 | 6/1982 | Mantovani et al. | 502/74 |

FOREIGN PATENT DOCUMENTS

1483459  8/1977  United Kingdom .

OTHER PUBLICATIONS

Matsuo & Klabunde, J. Org. Chem., 1982, vol. 47, 843–848.

*Primary Examiner*—D. E. Gantz
*Assistant Examiner*—Anthony McFarlane
*Attorney, Agent, or Firm*—Lalos, Leeds, Keegan, Marsh, Bentzen & Kaye

[57] ABSTRACT

Zeolite-metal catalysts having a substantial amount of catalytically active metal, e.g. iron, deposited in the cavities of the zeolite in zero-valent, small cluster form, are prepared by vaporizing the metal under low vapor pressure conditions in the vicinity of an organic liquid solvent, e.g. toluene, such that the metal dissolves in the solvent as a labile solvated zero-valent metal complex. This complex is contacted with the zeolite so that the complex diffuses into the cavities of the zeolite. Upon subsequent warming the solvated metal complex decomposes, leaving zero-valent small metal clusters in the zeolite cavities.

24 Claims, 2 Drawing Figures

METAL ZEOLITE CATALYST PREPARATION

This application is a continuation of U.S. application having Ser. No. 454,886, filed Dec. 30, 1982, now abandoned.

FIELD OF THE INVENTION

This invention relates to solid catalysts for performing heterogeneous phase reactions, and processes for their preparation. More particularly, it relates to metal catalysts in which the metal atoms are present in substantially zero-valent, small cluster form, in association with crystalline zeolite supports, and processes for their preparation.

BACKGROUND OF THE INVENTION AND PRIOR ART

Heterogeneous catalysis processes, using metal catalysts, are of commercial importance in a large number of chemical and petrochemical processes. In all cases, the economic performance of the processes depends, to a greater or lesser extent, on the activity of the catalyst, its selectivity towards the desired reaction product, and the cost and complexity of preparation of the catalyst in its most advantageous form for use in the particular process under consideration. For most efficient catalysis, the catalyst should have large metallic surface area, i.e. a large surface to bulk ratio. This is achieved by producing the catalyst comprising individual occurences of metal atoms (monatomic) where most of the metal atoms are atoms in the zero-valent form and wherein the individual occurrences of metal atoms (monatomic) form aggregates or clusters of up to 100 atoms per cluster. As used herein the term "cluster" refers to metal atoms weakly or strongly coupled, through space or through a support, a significant proportion of the metal atoms being in the zero-valent state and generally separated by a distance of six Angstroms (Å) or less. Such a cluster includes any aggregation of two or more metal atoms, of the same or different species, regardless of whether they occur in substantially one dimensional form (i.e. a chain of metal atoms), or two-dimensional form (i.e. a planar arrangement), a spiral arrangement or a three dimensional structure.

When bulk metals, especially transition metals, are vaporized e.g. by resistive heating, the initially formed vapor is in the monoatomic condition. Very rapidly indeed, under normal conditions, the single metal atoms agglomerate into small clusters on a surface, and then very rapidly bulk, colloidal metal is formed by further agglomeration.

U.S. Pat. No. 4,292,253, Ozin et al, issued Sept. 29, 1982, describes a process for preparation of a catalyst in which the catalytic metal is present, in significant amounts, in small cluster form and is stable at or near room temperatures. The process described involves the generation of vapors of the metal in a high vacuum environment and in the vicinity of a liquid polymer, so that the metals are effectively "trapped" by the polymer in monatomic or small cluster form and prevented from recombining to form colloidal metal.

Zeolites are a well-known and widely used type of heterogeneous catalyst, especially in connection with hydrocarbon reactions. Zeolites, also known as molecular sieves, are detailed in the texts "Zeolite Molecular Sieves" by D. W. Breck, John Wiley and Sons, Inc., N.Y., N.Y. (1974), "Chemistry of Catalytic Processes" by B. C. Gates, J. R. Katzer, and G. C. A. Schuit, McGraw-Hill, N.Y., N.Y, (1979), "Fluid Catalytic Cracking with Zeolite Catalysts" by P. B. Venuto and E. T. Habib, Jr., Marcel Dekker Inc., N.Y., N.Y., (1979) and "Heterogeneous Catalysts in Practice" by C. N. Satterfield, McGraw-Hill, N.Y., N.Y. (1980). Advances in zeolite technology and applications based on U.S. Patents issued since 1977 are described by J. Scott in "Zeolite Technology and Applications, Recent Advances", Noyes Data Corp., Park Ride, N.J. (1980). A proceeding of an international symposium is "Catalysis by Zeolites" by B. Imelik et al, Elsevier Scientific Publishing Co., N.Y., N.Y. (1980). P. Gallezot describes "the State and Catalytic Properties of Platinum and Palladium in Faujasite-Type Zeolites" in Catal. Rev.-Sci. Eng., 20, 121–154 (1979).

Zeolites are basically alumino silicates of alkali or alkaline earth metals, initially combined with substantial amounts of water of hydration. They possess a characteristic crystal structure which derives from the tetrahedral configuration of the $SiO_4$ unit which they contain, and the sharing of oxygen atoms from these tetrahedra with $AlO_4$ tetrahedra also present. Alkali or alkaline earth metal ions associate with the crystal lattice structure to satisfy the resultant electrostatic charge. The result is a three dimensional crystal structure having therein major and minor cavities, connected by channels, both the cavities and the channels being of substantially constant narrowly defined size in any given zeolite material. The channels and the cavities are of a size comparable to the dimensions of molecules. Small molecules may enter the cavities, and hence penetrate the pores of the zeolite whereas larger molecules may not—thus the materials can act as sieves, to separate molecules and hence to separate molecular mixtures into their component parts. Any reactants deposited on the inside surface of the cavity will only contact and react with molecules small enough to enter the cavity, thus offering the possibility of arranging for highly selective chemical reactions. Zeolite molecular sieves can be subjected to ion exchange reactions whereby the alkali or alkaline earth metal present in ionic form is exchanged for a different ionic species. Since normally much of the pore volume of the crystalline zeolite is occupied by water of hydration, the zeolite must be dehydrated, without destroying the crystal lattice structure, before it can normally be used as an effective catalyst.

D. Frenkel and B. G. Gates (J. Am. Chem. Soc., 102, 2478 (1980)) describe zeolite-encapsulated cobalt clusters prepared by the reduction of Co (II) cations exchanged into the A and Y type zeolites. Furthermore, metal vapors, especially cadmium vapors, were used to reduce the cobalt (II) cation to zero-valent cobalt thus leaving ionic cadmium species and metallic cobalt wwithin the zeolite cavity.

In the present invention, metal in the zero-valent (atomic) state is deposited in and on the zeolite. No reducing agent is needed, hence no other metal cation such as cadmium, as a result of reduction-oxidation, is co-deposited in and on the zeolite. No significant amounts of metallic contaminants, deriving from co-deposition agents, remain in the catalyst. Moreover, the manner in which the catalytically active metal is deposited by low pressure metal vapor deposition is entirely different.

SUMMARY OF THE INVENTION

It is an object of the present invention to provide a novel zeolite catalyst useful in heterogeneous phase chemistry wherein said catayst is comprised of a zeolite having a substantial amount (that quantity capable of producing a chemical transformation) of catalytically active metal deposited in the zeolite cavities, wherein the metal is comprised of individual occurrences of atoms of one or more metallic elements and clusters formed by aggregation thereof.

It is still another object of the present invention to provide said zeolite-metal catalyst wherein said catalyst is supported on a non-zeolite matrix.

It is another object of the present invention to provide a novel process for preparing zeolite catalysts useful in heterogeneous phase chemical reactions.

It is a further object to provide such a process which produces such catalysts containing small clusters of zero-valent, catalytically-active metal.

Another object is the provision of novel catalysts comprising natural or synthetic zeolite materials having catalytically active metal clusters deposited therein, and novel processes for their production.

It is a further object of the invention to provide a hydrocarbon conversion process which comprises contacting a hydrocarbon charge under catalytic conditions with a novel zeolite catalyst.

As used herein the term "solvent" defines a substance used herein to dissolve the metal-complex such that the metal complex-solvent mixture results in a solution.

In the process of the present invention, metals are introduced into or onto dehydrated zeolite catalyst supports, in a catalytically active form, by deposition of solvated metal atoms which can aggregate to clusters from solution in a liquid organic solvent. A single metal can be deposited into or onto a zeolite support or a plurality of metals can be deposited thereon, either simultaneously or sequentially by means of this process.

The desired catalytic metal is vaporized into the liquid solvent. Monatomic zero-valent metal which can aggregate to form small clusters is produced in the vaporization process. The metal becomes solvated by the solvent in the form of a labile solvated metal complex dissolved in the solvent. In this form, the solvated metal complex and solvent contact the zeolite support, so that solvated metal can diffuse into the cavities of the zeolite support. After sufficient metal complex has diffused into the zeolite support, the excess of solvated metal complex and liquid solvent can be removed, e.g. by filtering, and then the composite warmed. On doing so, the labile solvated metal complex dissociates, leaving zero-valent metal in the zeolite cavities. This zero-valent metal may remain within the zeolite cavity in monatomic form, but more probably aggregates therein to form small clusters. Some metal clusters can form also on the surface of the zeolite. Macro, colloidal metal is unlikely to form in the zeolite cavity, because of the space limitations therein. The resultant metal-loaded zeolite catalyst is stable at room or elevated temperatures, and has catalytic activity.

The catalytic products of the present invention are zeolite-metal catalysts in which the catalytically active metal is present in effective amounts in essentially zero-valent clusters or metal atoms. The clusters exhibit a high degree of uniformity in size in any given zeolite-metal catalyst batch. At least about 90% of the metal clusters within the zeolite cavities of the batch are within about a five Angstrom range. This can lead to significant practical advantages in use of the catalyst, e.g. an improved selectivity of the catalytic activity towards various gas phase reactions. The avoidance of the use of high temperatures in the process of metal deposition into and onto the zeolite in the present invention favours the formation of clusters of substantially uniform size, due to kinetic factors. Moreover, the catalysts of the present invention are essentially free from any residual contaminants resulting from the use of a co-deposition agent such as a metal vapor. The only agent used in the metal deposition process of the present invention is the solvent, and this is substantially removed from the catalyst e.g. by volatilization, leaving only traces of impurities introduced by the solvent which are totally insignificant as far as subsequent catalytic activity is concerned.

BRIEF REFERENCE TO THE DRAWINGS

DESCRIPTION OF THE PREFERRED EMBODIMENTS

Figure 1:
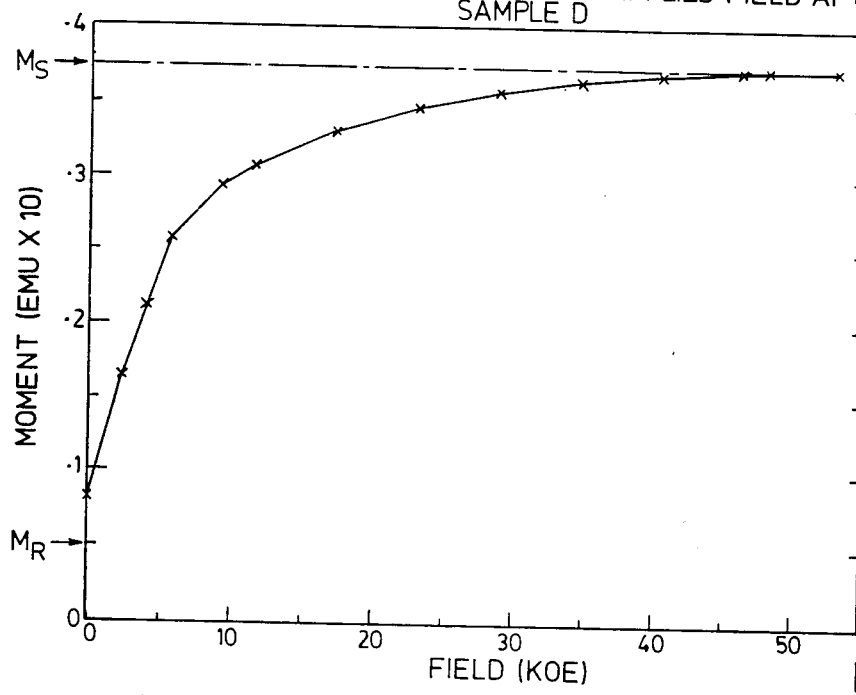
FIG. 1 is a graphical presentation of the magnetic measurements conducted on catalyst samples made in Example 1.

Preferred metals for use in the process of the present invention are transition metals such as titanium, zirconium, vanadium, niobium, tantalum, molybdenum, chromium, iron, cobalt, nickel, rhodium, ruthenium, osmium, iridium, palladium, platinum, tungsten, copper and silver. More preferred are the platinum group metals, namely iron, ruthenium, osmium, cobalt, rhodium, iridium, nickel, palladium and platinum, and also vanadium, chromium, molybdenum and silver. Preferred zeolites are those classed as zeolites Y and zeolites X (Faujasite types). Prior to use in the process of the present invention, the zeolite should be dehydrated, using methods well known in the art. The use of synthetic zeolites, such as ZMS 5 ®, as well as natural zeolites, is within the scope of the invention.

The conditions under which the catalyst is prepared should be chosen so that the solvated metal complex is readily formed and maintained long enough for contact with the zeolite to be accomplished, without substantial colloidal metal formation. The best conditions will vary depending upon the choice of metal and solvent. In most cases, the metal will need to be vaporized under conditions of low vapor pressure, to ensure that sufficient zero-valent monatomic or small cluster metal contacts the solvent. Also in most cases, the metal vaporization and solvent contacting should be done at low temperatures, since many of the suitable solvated metal complexes are only stable at low temperatures.

It is preferred to form a slurry of the zeolite catalyst support in the chosen solvent (in which the zeolite is substantially insoluble), and then to contact the slurry with the vapor of the metal, or with the preformed solvated metal complex. In this way, the risk of formation of colloidal metal prior to contacting the zeolite is minimized.

In order to obtain homogeneity of the metal dispersion throughout the zeolite catalyst, it is preferred to vaporize the metal in the vicinity of a thin film of zeolite-solvent slurry, the film being moved continuously relative to the source of vaporizing metal. One way of achieving this is to dispose the source of vaporizing metal at the approximate center of an evacuated rotating vessel containing the zeolite-solvent slurry. In this manner, the slurry can be arranged to form a thin film on the walls of the rotating vessel surrounding the source of vaporizing metal, thereby ensuring an even exposure of the slurry to vaporizing metal and, as an end product, a relatively homogeneous solid catalysts. Alternatively, the metal vapor can be deposited into the preferred solvent, and subsequently the solution of solvated metal atoms so formed contacted with the preferred zeolite. Vaporization of the metal can be caused by a variety of known methods, such as resistive heating, electron beam bombardment, laser evaporation and the like, to cause localized heating only of the bulk metal. Suitably, the metal is contained in an electrically heated crucible located at the center of the rotating evacuated flask.

Suitable apparatus for conducting the process of the present invention is described in the prior art, and is commercially available. For example, such an apparatus is described in British Patent Specification No. 1,483,459 National Research and Development Corporation, published Aug. 17, 1977. A suitable apparatus is commercially available from G. V. Planer Ltd., Sunbury-on-Thames, England, under the designation "Vapor Synthesis Equipment type VSP 101" or "type VSP 302".

The metal cluster may form in the zeolite cavity as linear chains, spirals, planar two-dimensional structures or three-dimensional networks. It is believed that the solvated metal is initially deposited in the zeolite cavity in solvated, monatomic form, and metal clusters are formed subsequently, on removal of the solvent. It is also possible that a small number of the metal atoms become ionized upon removal of the solvent, so that the resultant clusters contain a small proportion of metal ions, giving to the cluster as a whole an overall ionic charge. However, the predominant amount of metal in the cluster remains in the zero-valent form. The metal atoms of the clusters are coupled together weakly (Van der Waals forces) or strongly (covalent bonds), but not to any significant extent by ionic forces.

The amount of metal which is deposited on the zeolite according to the present invention is not critical, provided of course that sufficient metal is deposited to create an active catalyst. Preferred amounts of metal are in the approximate range 0.01–10% by weight, based on the weight of zeolite, most preferred amounts being from about 1 weight % to about 10 weight %.

An example of a specific combination of zeolite, solvent and metal in accordance with the present invention is Faujasite type zeolite, toluene and a metal such as iron, cobalt or nickel, and so for convenience the process of the present invention will be further described with reference thereto. However, this is in no way to be construed as limiting the scope of the invention, and is for ease of further and complete description of the process only.

Iron metal is vaporized by resistive heating, in an apparatus comprising an evacuated flask adapted to rotate preferably on an inclined angle, the vaporizing iron being located in a crucible substantially at the center of the flask. Suitably, for quantitative deposition of metal, it is preferred that an in situ mass monitor such as a quartz crystal microbalance be employed. The flask contains the slurry of zeolite in toluene. As the metal is vaporized, the flask is rotated about the source of vaporization so that the liquid slurry of solid zeolite and liquid toluene forms a thin film on the walls of the flask. The vaporized iron, in monatomic form Fe°, contacts and becomes solvated by the toluene, dissolving therein in the form of a labile bis(toluene) iron (O) complex, believed to be of general structure:

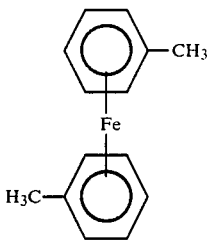

This process is conducted at low vapor pressures within the flask, e.g. $10^{-3}$–$10^{-5}$ torr, and at low temperatures, e.g. $-100°$ C. In any event, for this combination, the temperature of preparation should not exceed $-30°$ C.–$-50°$ C., since at such temperatures and above, the toluene-iron complex dissociates and iron precipitates as colloidal metal.

The thus solvated iron complex contacts the zeolite in the slurry in this form, and migrates or diffuses into the cavities of the zeolite in this form. The iron toluene complex has a molecular size of the order of 7 Å allowing it to enter through the 7.5 Å size windows of the α-cavities of the zeolite. The metal vaporization process in the presence of the slurry is continued under these conditions for a suitable period of time until the desired degree of solvated metal complex loading into the zeolite has been attained.

Next, the slurry is removed from the contacting vessel, and the zeolite-iron solid is separated from excess toluene and residual solvated iron complex dissolved therein. For this purpose, the low temperature should be maintained to avoid decomposition of the solvated toluene-iron complex at this stage. Filtration, at temperatures above the solvent freezing point but below about $-30°$ C., is a suitable procedure.

For most catalytic purposes, a zeolite-based catalyst is to be employed in conducting selective catalytic processes, so that the catalytically active chemical species needs to be disposed inside the zeolite cavities. The catalytically active metal atoms or clusters are more stable to agglomeration when disposed within the zeolite cavity. Catalyst on the outside surface of the zeolite will contact all species of a reactant mixture. The next step in the preferred process of the present invention is therefore designed to remove adsorbed solvated iron complexes from the outer surface of the zeolite, resulting from the above contacting steps leaving substantially intact the complexes within the cavities. This is accomplished by washing the solid zeolite-iron material with further solvent, namely toluene, at low temperatures i.e. lower than $-30°$ C.

While it is important that the metal in the monoatomic or small cluster, zero-valent form be deposited within the cavities of the zeolite, unremoved metal deposited on and around the zeolite substrate may be beneficial as a specific and selective catalyst in its own right. In addition, the exterior deposited metal catalyst on the zeolite may be modified, e.g. poisoned, by treatment with appropriate reagents.

After the washing process is completed, the solid zeolite-iron catalyst is allowed to warm up to room temperature, whilst subjected to vacuum pumping to remove some of the toluene formed from decomposition of the solvated iron complex and remaining from the wash operations. As the temperature rises above about $-30°$ C., the bis(toluene) iron (O) complex decomposes to release toluene. The metal stays within the zeolite cavity in zero-valent form, either in monatomic or small cluster form. Due to constraints on the mobility of the metal atoms under these conditions, metal atoms will preferentially agglomerate in the $\alpha$-cavities in the form of small clusters, due to the restricted space available, and the production of macro form colloidal metal on the outside surface of the zeolite will be minimised.

As a result, a loading of iron from 0.3 to 0.6 weight percent, based on the weight of the zeolite, is achieved in the catalyst. The material is now stable at room temperatures, but must be stored in vacuo or under inert atmosphere, e.g. argon, until it is to be used. No further activation treatment of the material is necessary before it is employed as a catalyst, apart from possible removal of residual solvent, its metal component already being present as a catalytically active substantially zero-valent form. The material can be used in any of the heterogeneous phase catalytic processes for which supported iron catalysts have previously been used, for example, hydrogenation, dehydrogenation, Fischer-Tropsch reactions, catalytic carbon monoxide hydrogenation, and ammonia synthesis. Analysis has indicated that about 80-90% of the iron metal associated with the catalyst is present in small cluster (less than 100 atoms) form, at least the major portion of which is within the $\alpha$-cavities of the zeolite.

Alternative solvents for use in the present invention include, in addition to toluene, tetrahydrofuran, methyltetrahydrofuran, glyme(dimethyl ether of ethylene glycol), diglyme (dimethyl ether of diethylene glycol), alkenes, acyclic or cyclic dienes e.g. cyclopentadiene, cyclo-octadiene, ethers, aromatic hydrocarbons (xylenes, mesitylene, methylnaphthalenes etc.), nitriles such as acetonitrile, and siloxanes. Mixtures of two or more solvents can also be used. Other solvent examples will readily occur to those skilled in the art. Solvent choice is determined by its ability to solvate the chosen catalytic metal in zero-valent form, the ability of the resultant complex to enter the pore and solvent inertness towards the appropriate zeolite. Ease of removal of solvent from the zeolite and solvent properties such as freezing point, boiling point and vapor pressure are all factors readily determinable from standard reference works. Toluene is especially suitable with the platinum group metals, with $-100°$ C. being a suitable operating temperature range for preparing the catalyst. 1,5-Cyclooctadiene is suitable with iron, cobalt, nickel, palladium and platinum. Tetrahydrofuran and methyltetrahydrofuran are suitable for use with silver and palladium, operating at temperatures in the $-90°$ C. to $-125°$ C. range. Glyme and diglyme, suitable for use with silver, molybdenum and chromium, can be operated at temperatures of $-30°$ C. and $-60°$ C. respectively.

If desired, using the process of the present invention, one can prepare catalysts having mixed metal clusters in or on the zeolite. This is accomplished by choosing a solvent or mixture of solvents which will solvate each of the chosen metals, and vaporizing the mixture of metals in the vicinity of the solvent as described above.

The invention is further described in the following speific examples, for illustrative purposes only.

EXAMPLE 1

A slurry of 1.0 g of dehydrated Na-Y zeolite in 80 ml of toluene was transferred by cannulation under nitrogen into a 2 liter flask attached to a rotary metal vapor apparatus. 100 mg of iron was resistively vaporized into the cooled ($-100°$ C.) slurry at a pressure of about $9 \times 10^{-5}$ torr, over a period of about $\frac{3}{4}$ hour, monitoring the metal deposition rate by means of a quartz crystal microbalance situated just above the iron-containing crucible. The flask was rotated throughout the above procedure at a speed which ensured a thin film of the slurry formed as a wide band at the centre of the walls of the flask. After the metal evaporation was complete, the rotation was stopped and the contents of the flask removed through a cold nitrogen gas jacketed transfer tube (kept at $-70°$ C.) which extended directly into a dry ice/acetone cooled filtration apparatus equipped with high vacuum teflon stopcocks. Still at low temperature, excess bis(toluene) iron (O) was filtered off through a glass frit, and the zeolite remaining on the frit was washed with $2 \times 20$ ml cold ($-70°$ C.) toluene. The zeolite was pumped to partial dryness and then allowed to warm slowly to room temperature under dynamic vacuum (c. 2 hours). The zeolite was left in vacuo for an additional 3 hours. All subsequent manipulations were performed in an argon filled glove box containing less than 1 ppm oxygen.

Magnetic measurements were conducted on samples of the product. The samples (approximately 100 mg of Fe°/NaY) were tapped into a glass tube, and packed down with a plug of glass wool. The tube was then sealed under a partial vacuum. Magnetic moment measurements as a function of applied field were obtained on a vibrating magnetometer (Janis Research Company, Model 150) at 4.2° K., 77° K. and room temperature, and particle volumes were calculated using the Langevin Low Field and High Field approximations. The measurements of applied field (Kilo-Oersteds, KOE) and corresponding magnetic moments (EMU$\times$10) are plotted graphically as illustrated in FIG. 1. The value for $M_S$ (saturation magnetization) is obtained from a separate plot of magnetic moment v. reciprocal of applied field, extrapolated to infinite field. Very small particles require higher fields for $M_S$, because it is more difficult to align their magnetic moments completely. The magnetic remanence $M_R$ derives from the presence of large particles in the sample. The percentage $M_R/M_S$ is equal to the percentage of particles exceeding a given size (in this case, about 30 Å, calculated from the standard expression for the magnetic relaxation time at 4.2° K.).

The results of such magnetic measurements on four independently prepared samples prepared as described are given in Table I below. Diameters are determined assuming spherical geometry for the iron clusters. Samples A and B differ from samples C and D in that the former were washed with cold toluene after filtering whereas the latter were not.

TABLE 1

| | ZERO-VALENT IRON | | | | γ-IRON OXIDE | | |
|---|---|---|---|---|---|---|---|
| Sample | Particle diameter (A) measured at high field | Particle diameter (A) measured at low field | Mean particle diameter (A) | % $M_R/M_S$ | Particle diameter (A) measured at high field | Particle diameter (A) measured at low field | Mean particle diameter (A) |
| A | 4.9 | 9.7 | 7.3 | 8.0 | 7.8 | 15.1 | 11.4 |
| B | 4.3 | 5.6 | 4.9 | 5.0 | 6.3 | 8.9 | 7.8 |
| C | 7.0 | 8.6 | 7.8 | 22 | 11.1 | 13.8 | 12.4 |
| D | 5.8 | 8.4 | 7.1 | 19.6 | 5.3 | 13.1 | 11.2 |

The Mossbauer results show (see later) that the samples may contain a substantial amount of iron oxide as well as zero-valent iron clusters.

The magnetization results indicate that the average particle size is about 6–8 Å (if entirely zero-valent Fe) and 8–13A (if entirely α-iron oxide) in the use of each sample. Therefore one can infer, in the case of washed samples A and B, that approximately 80% of the iron clusters probably reside inside the α-cavities of the zeolite. Such particles must therefore be of a size less than 12 Å, the size of constraint of the zeolite cage. The remainder, represented by the $M_R/M_S$ fraction, lie on the outer surface of the zeolite particles, and have particle sizes greater than about 30 Å. The results also indicate that the metal clusters in each sample are largely uniform in size. In sample A, for example, the clusters within the zeolite cavity are of a particle size in the approximate range 4.9–9.7 Å. (If entirely zero-valent iron) and 7.8–15.1 (if entirely) α-iron oxide. Samples C and D also indicate that the invention provides catalysts in which the clusters in the zeolite cavities are at least predominantly of a size within a 5 Å range. The particle diameter measured at high and low fields can confidently be interpreted to embrace at least 80% of the clusters within the zeolite cavity.

EXAMPLE 2

The catalyst preparation procedure described in Example 1 was repeated, using approximately 20% $^{57}$Fe enriched iron powder as the evaporant. Samples of the resultant products were analysed by Mossbauer spectroscopy.

400 mg of dry Fe°/NaY was transferred under argon to an airtight Mossbauer cell. Mossbauer spectra were recorded over a period of 4 days–1 week at room temperature using a 25 milliCurie $^{57}$Co/Rh source obtained from The New England Nuclear Co. All spectra were fitted using at least squares fittng programme, as two quadrupole doublets, resulting in $\chi^2$ values of less than 300.

Figure 2:
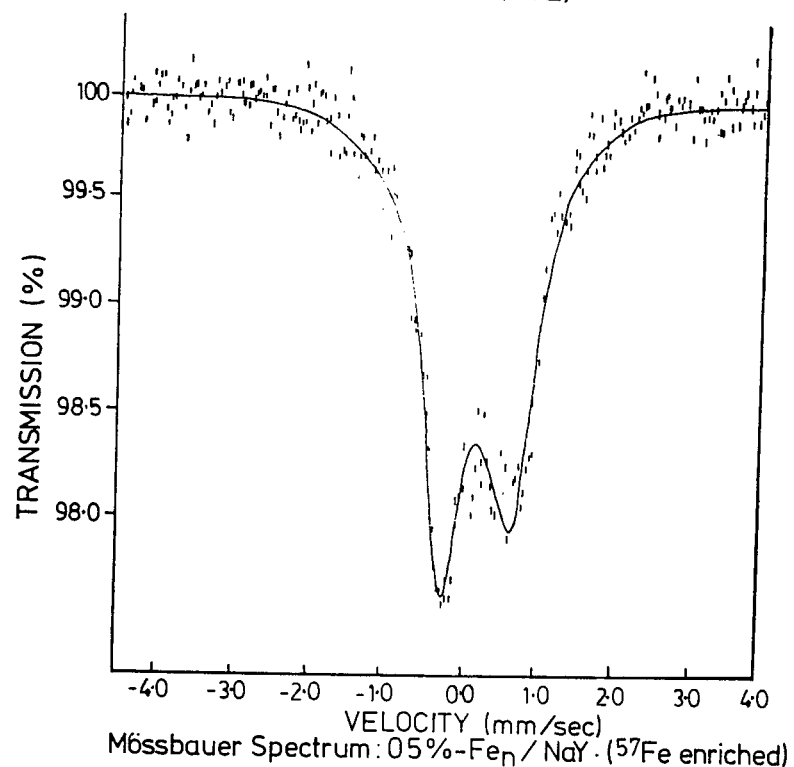
FIG. 2 is a Mossbauer spectrum of the catalyst sample of Example 2.

A representative Mossbauer spectrum is shown in FIG. 2. One doublet is ascribed to the zero-valent iron of the iron cluster (isomer shift 0.14 mm/sec) and the other doublet is ascribed to the iron oxide apparent of the clusters (isomer shift 0.31 mm/sec). Typical Mossbauer parameter associated with FIG. 2 are as follows:

Isomer shift, IS: 0.14 mm/sec
Quadrupole split, QS: 0.60 mm/sec
Relative Area: 37%
Isomer shift IS$_2$: 0.31 mm/sec
Quadruople split QS$_2$: 1.08 mm/sec
Relative Area: 63%

Comparison of these isomer shift values with those available in the literature for small iron clusters in oxide or zeolite supports generated by other methods indicates that the iron clusters have a substantial zero-valent component, with the large quadrupole splitting demonstrating a high electronic charge asymmetry, characteristic of very small iron clusters and/or interaction with the electrostatic field gradient of the zeolite cage.

EXAMPLE 3

An Fe°/NaY zeolite catalyst was prepared as described for washed samples in Example 1, and its behaviour for catalytic carbon monoxide hydrogenation was tested. A catalytic flow systm with on-line gas chromatographic analysis for $C_1$–$C_5$ hydrocarbon products was used, at a temperature of 260° C., hydrogen:carbon monoxide ratio of 2:1 and a gas flow rate of 15 ml per min. The product mixture had the following analysis:

Mole % $C_1$: 19
Mole % $C_2$: 2
Mole % $C_3$: 9
Mole % $C_4$: 47
Mole % $C_5$: 23

The percentage of olefins in the total hydrocarbon product (methane excepted) was greater than 90%. The low methane and high butene production is also noteworthy.

EXAMPLE 4

The procedure of example 1 was essentially repeated, but using cobalt as the metal, along with toluene solvent and Na-Y zeolite. The catalyst was prepared by vaporizing the metal by resistive heating in the presence of a thin rotating film of solvent-zeolite slurry at low temperature and vapor pressure, then filtering off excess liquid and allowing the solid to warm to room temperature under an inert atmosphere to volatilize the solvent. Essentially similar results were obtained, small clusters of predominantly zero-valent cobalt being deposited in the zeolite cavities. The resulting product was catalytically active in gas phase reactions.

We claim:

1. A zeolite-metal catalyst having an effective amount of catalytically active metal in the form of essentially zero-valent clusters of metal atoms, at least 80% of the metal clusters within the zeolite cavity being of a size within about a five Angstrom range.

2. A zeolite-metal catalyst according to claim 1, said catalyst being essentially free from contaminants deriving from co-deposition agents.

3. A zeolite-metal catalyst according to claim 2, wherein the clusters of metal atoms contain up to about 100 atoms per cluster.

4. A zeolite-metal catalyst according to claim 2, wherein the clusters of metal atoms within the zeolite cavity are of a size range of from about 4 Å to about 12 Å, at least 80% thereof being within a five Å range inside said size range.

5. A zeolite-metal catalyst according to claim 2, wherein the metal is selected from the group consisting of iron, cobalt, chromium, molybdenum, titanium, zirconium, vanadium, niobium, tantalum, platinum, palladium, rhodium, ruthenium, osmium, iridium, tungsten, nickel, copper and silver.

6. A zeolite-metal catalyst according to claim 2, wherein the metal is selected from the group consisting of iron, ruthenium, osmium, iridium, cobalt, rhodium, nickel, palladium, platinum, titanium, vanadium, chromium, molybdenum and silver.

7. A zeolite-metal catalyst according to claim 2, wherein the metal is selected from the group consisting of iron, cobalt and nickel.

8. A zeolite-metal catalyst according to claim 5, wherein the zeolite is a Faujasite type natural zeolite.

9. A zeolite-metal catalyst according to claim 5, wherein the zeolite is a synthetic zeolite.

10. A process of preparing zeolite-metal catalysts having a substantial amount of catalytically active metal deposited in the cavities of the zeolite in zero-valent, small cluster form, which comprises:
    vaporizing the metal in the vicinity of an organic liquid solvent which is capable of dissolving the catalytic metal;
    dissolving the metal as a labile solvated zero-valent complex in the liquid solvent to form a liquid mixture of solvent and solvated zero-valent metal complex dissolved therein;
    contacting said liquid mixture with a solid zeolite crystalline material so as to cause diffusion of the solvated metal complex into the cavities of the zeolite;
    removing excess liquid solvent or solution;
    and warming the zeolite so as to dissociate the labile solvated metal complex in the cavities and deposit zero-valent small cluster metal therein.

11. The process of claim 10, including the step of washing the zeolite-metal complex with solvent under conditions at which the solvated metal complex is stable, after removal of excess liquid solvent or solution therefrom.

12. The process of claim 11 wherein the metal vaporization, the dissolving of the metal, the contacting with zeolite and the removal of excess liquid all take place at a temperature from room temperature down to the freezing point of the chosen organic solvent.

13. The process of claim 12 wherein the metal is vaporized under conditions of low vapor pressure, in the vicinity of a moving film of the chosen organic solvent.

14. The process of claim 13, wherein the moving film of organic solvent comprises a pre-formed slurry of solvent and zeolite.

15. The process of claim 13 wherein the metal selected from the group consisting of iron, cobalt, molybdenum, chromium, titanium, zirconium, vanadium, niobium, tantalum, platinum, palladium, rhodium, ruthenium, osmium, iridium, tungsten, nickel, copper and silver.

16. The process of claim 13, wherein the metal is selected from the group consisting of iron, ruthenium, osmium, iridium, cobalt, rhodium, nickel, palladium, platinum, titanium, vanadium, chromium, molybdenum and silver.

17. The process of claim 13 wherein a plurality of metals is deposited into or onto a zeolite support, either simultaneously or sequentially.

18. The process of claim 13 wherein the zeolite is a Faujasite type natural zeolite.

19. The process of claim 13 wherein the zeolite is a synthetic zeolite.

20. The process of claim 13 wherein the zeolite pores have openings of 3 Å to 13 Å.

21. The process of claim 10 wherein the solvent is selected from aromatic hydrocarbons, ethers, alkenes, acyclic or cyclic dienes, nitriles, and siloxanes and suitable mixtures thereof.

22. The process of claim 10 wherein the metal is iron, cobalt or nickel and the solvent is toluene.

23. The process of claim 10 wherein iron is vaporized in a rotating vessel containing a liquid slurry of zeolite and toluene, said slurry being disposed as a moving film on the walls of said rotating vessel.

24. The process of claim 10 wherein the said zeolite metal catalyst is supported on a non-zeolite matrix.

* * * * *